United States Patent
Xu

(10) Patent No.: US 11,893,406 B2
(45) Date of Patent: Feb. 6, 2024

(54) USING VIRTUAL LOCAL AREA NETWORKS IN A VIRTUAL COMPUTER SYSTEM

(71) Applicant: VMware, Inc., Palo Alto, CA (US)

(72) Inventor: Hao Xu, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 401 days.

(21) Appl. No.: 17/011,631

(22) Filed: Sep. 3, 2020

(65) Prior Publication Data
US 2021/0208921 A1 Jul. 8, 2021

Related U.S. Application Data

(63) Continuation of application No. 14/231,661, filed on Mar. 31, 2014, now Pat. No. 10,768,958, which is a continuation of application No. 10/991,638, filed on Nov. 17, 2004, now Pat. No. 9,043,792.

(51) Int. Cl.
G06F 9/455 (2018.01)
H04L 67/10 (2022.01)

(52) U.S. Cl.
CPC .......... *G06F 9/45558* (2013.01); *H04L 67/10* (2013.01); *G06F 2009/45587* (2013.01); *G06F 2009/45595* (2013.01)

(58) Field of Classification Search
CPC ....... G06F 9/45558; G06F 2009/45587; G06F 2009/45595; H04L 67/10; H04L 12/4641
See application file for complete search history.

(56) References Cited

U.S. PATENT DOCUMENTS

| | | | |
|---|---|---|---|
| 5,892,912 A | 4/1999 | Suzuki et al. | |
| 6,081,552 A | 6/2000 | Hendel et al. | |
| 6,085,238 A | 7/2000 | Yuasa et al. | |
| 6,167,052 A | 12/2000 | McNeill et al. | |
| 6,172,981 B1 | 1/2001 | Cox et al. | |

(Continued)

OTHER PUBLICATIONS

Vi Cross, Redbooks paper, "Linus on IBM eServer ZSeries and S/390: Vswitch and VLAN features of Z/VM 4.4", 2003, pp. 1-44.

(Continued)

*Primary Examiner* — Kenneth Tang
(74) *Attorney, Agent, or Firm* — King Intellectual Asset Management

(57) ABSTRACT

A virtual computer system includes virtualization software, and one or more physical network interfaces for connecting to one or more computer networks. The virtualization software supports one or more virtual machines (VMs), and exports one or more virtual network interfaces to the VM(s) to enable the VM(s) to access the computer network(s) through the physical network interface(s). The virtualization software modifies and filters network data frames from the VM(s) and from the physical network interface(s) to restrict one or more VMs to one or more virtual local area networks (VLANs) that are implemented within a VLAN topology. Restricting a VM to a VLAN limits the broadcast domain to which the VM belongs, which may reduce security risks facing the VM. Implementing the VLAN functionality within the virtualization software provides the functionality to every VM in the computer system, without requiring every VM to provide the functionality.

20 Claims, 5 Drawing Sheets

(56) References Cited

U.S. PATENT DOCUMENTS

| | | |
|---|---|---|
| 6,305,105 B1 | 10/2001 | McCloghrie et al. |
| 6,430,621 B1 | 8/2002 | Srikanth et al. |
| 6,590,861 B1 | 7/2003 | Vepa et al. |
| 6,633,567 B1 | 10/2003 | Brown |
| 6,678,273 B1 | 1/2004 | Brown |
| 6,711,171 B1 | 3/2004 | Dobbins et al. |
| 6,912,592 B2 | 6/2005 | Yip |
| 6,990,106 B2 | 1/2006 | Bhatia |
| 7,092,389 B2 | 8/2006 | Chase et al. |
| 7,154,899 B2 | 12/2006 | Khill |
| 7,203,944 B1 | 4/2007 | van Rietschote et al. |
| 7,213,065 B2 | 5/2007 | Watt |
| 7,302,432 B2 | 11/2007 | Brown |
| 7,356,818 B2 | 4/2008 | Carollo et al. |
| 7,356,841 B2 | 4/2008 | Wilson et al. |
| 7,478,173 B1 | 1/2009 | Delco |
| 7,484,210 B2 | 1/2009 | Lewites et al. |
| 7,512,075 B1 | 3/2009 | Paul et al. |
| 7,515,589 B2 | 4/2009 | Bacher et al. |
| 7,606,939 B1 | 10/2009 | Finn |
| 2002/0009078 A1 | 1/2002 | Wilson et al. |
| 2002/0010793 A1 | 1/2002 | Noll et al. |
| 2002/0069335 A1 | 6/2002 | Flylnn |
| 2003/0037089 A1 | 2/2003 | Cota-Robles et al. |
| 2004/0037295 A1 | 2/2004 | Tanaka et al. |
| 2004/0044744 A1 | 3/2004 | Grosner et al. |
| 2004/0202185 A1 | 10/2004 | Ratcliff et al. |
| 2004/0215948 A1 | 10/2004 | Abbey et al. |
| 2004/0218584 A1 | 11/2004 | Brown |
| 2004/0221290 A1 | 11/2004 | Casey et al. |
| 2005/0058118 A1 | 3/2005 | Davis et al. |
| 2005/0198633 A1 | 9/2005 | Lantz et al. |
| 2006/0045089 A1 | 3/2006 | Bacher et al. |
| 2011/0090910 A1* | 4/2011 | Tripathi .......... H04L 49/00 370/395.1 |
| 2011/0134793 A1* | 6/2011 | Elsen ............... H04L 45/18 370/254 |
| 2013/0107872 A1* | 5/2013 | Lovett ............. H04L 49/70 370/352 |
| 2013/0156028 A1* | 6/2013 | Hernandez ...... H04L 12/4641 370/359 |
| 2014/0003442 A1* | 1/2014 | Hernandez ...... H04L 49/70 370/401 |
| 2014/0112205 A1* | 4/2014 | Prakash .......... H04L 12/4625 370/256 |
| 2016/0350151 A1* | 12/2016 | Zou ............... H04L 67/61 |
| 2017/0134278 A1* | 5/2017 | Benny ............. H04L 49/70 |

OTHER PUBLICATIONS

Cisco "overview of routing between virtual LANs", Cisco IOS software releases 11.3 Cisco, Aug. 5, 2004, pp. 1-4.

"IEEE standards for local and metropolitan area networks Virtual bridged local networks," 2003, IEEE, 3rd edition, pp. 1-312.

HP "HP-Ux VLAN, planning and implementing VLANs with HP-Ux," Mar. 2002, pp. 1-11.

Cisco II "CCNA self-study (ICND exam): extending switch networks with the virtual LANs," Dec. 2003, pp. 1-6.

* cited by examiner

USING VIRTUAL LOCAL AREA NETWORKS IN A VIRTUAL COMPUTER SYSTEM

CROSS-REFERENCE TO RELATED APPLICATION(S)

This application is a continuation of U.S. patent application Ser. No. 14/231,661 filed Mar. 31, 2014, now U.S. Pat. No. 10,768,958 which issued on Sep. 8, 2020, entitled "Using Virtual Local Area Networks in A Virtual Computer System" which is a continuation of U.S. patent application Ser. No. 10/991,638 filed Nov. 17, 2004, now U.S. Pat. No. 9,043,792 which issued on May 26, 2015, entitled "Using Virtual Local Area Networks in A Virtual Computer System" all of which are incorporated by reference herein in their entireties.

BACKGROUND OF THE INVENTION

Field of the Invention

This invention relates to virtualized computer systems, and, in particular, to a system and method for providing network access to a virtual computer within a physical computer.

Description of the Related Art

The advantages of virtual machine technology are widely recognized. Among these advantages is the ability to run multiple virtual computers (or "virtual machines") on a single physical computer. This can make better use of the capacity of the hardware, while still ensuring that each user or application enjoys the features of a "complete," isolated computer. A general virtual computer system is described below as background information for the invention.

General Virtualized Computer System

As is well known in the field of computer science, a virtual machine (VM) is a software abstraction or a "virtualization," often of an actual physical computer system. FIG. 1 illustrates the general configuration of a virtual computer system 700, including one or more virtual machines (VMs), such as a first VM 200 and a second VM 200N, each of which is installed as a "guest" on a "host" hardware platform 100.

As FIG. 1 shows, the hardware platform 100 includes one or more processors (CPUs) 110, system memory 130, and a local disk 140. The system memory is typically some form of high-speed RAM (random access memory), whereas the disk (one or more) is typically a non-volatile, mass storage device. The hardware 100 may also include other conventional mechanisms such as a memory management unit (MMU) 150, various registers 160 and various input/output (I/O) devices 170.

Each VM 200, 200N typically includes at least one virtual CPU 210, at least one virtual disk 240, a virtual system memory 230, a guest operating system 220 (which may simply be a copy of a conventional operating system), and various virtual devices 270, in which case the guest operating system ("guest OS") may include corresponding drivers 224. All of the components of the VM may be implemented in software using known techniques to emulate the corresponding components of an actual computer.

If the VM is properly designed, then it will generally not be apparent to the user that any applications 260 running within the VM are running indirectly, that is, via the guest OS and virtual processor. Applications 260 running within the VM will typically act just as they would if run on a "real" computer, except for a decrease in running speed, which may only be noticeable in exceptionally time-critical applications. Executable files will be accessed by the guest OS from a virtual disk or virtual memory, which may simply be portions of an actual physical disk or physical memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is generally required between a VM and the underlying host platform (in particular, the CPU), which is responsible for actually executing VM-issued instructions and transferring data to and from the actual memory and storage devices. A common term for this interface is a "virtual machine monitor" (VMM), shown as a component 300. A VMM is usually a thin piece of software that runs directly on top of a host, or directly on the hardware, and virtualizes the resources of a physical host machine. Among other components, the VMM therefore usually includes device emulators 330, which may constitute the virtual devices 270 that the VM 200 accesses. The interface exported to the VM may be the same as the hardware interface of the underlying physical machine, so that the guest OS cannot determine the presence of the VMM.

The VMM also usually tracks and either forwards (to some form of operating system) or itself schedules and handles all requests by its VM for machine resources, as well as various faults and interrupts. A mechanism known in the art as an exception or interrupt handler 355 may therefore be included in the VMM. As is well known, such an interrupt/exception handler normally includes an interrupt descriptor table (IDT), or some similar table, which is typically a data structure that uses information in the interrupt signal to point to an entry address for a set of instructions that are to be executed when the interrupt/exception occurs.

Although the VM (and thus the user of applications running in the VM) cannot usually detect the presence of the VMM, the VMM and the VM may be viewed as together forming a single virtual computer. They are shown in FIG. 1 as separate components for the sake of clarity.

Moreover, the various virtualized hardware components such as the virtual CPU(s) 210, the virtual memory 230, the virtual disk 240, and the virtual device(s) 270 are shown as being part of the VM 200 for the sake of conceptual simplicity—in actual implementations these "components" are usually constructs or emulations exported to the VM by the VMM. For example, the virtual disk 240 is shown as being within the VM 200. This virtual component, which could alternatively be included among the virtual devices 270, may in fact be implemented as one of the device emulators 330 in the VMM.

The device emulators 330 emulate the system resources for use within the VM. These device emulators will then typically also handle any necessary conversions between the resources as exported to the VM and the actual physical resources. One advantage of such an arrangement is that the VMM may be set up to expose "generic" devices, which facilitates VM migration and hardware platform-independence. For example, the VMM may be set up with a device emulator 330 that emulates a standard Small Computer System Interface (SCSI) disk, so that the virtual disk 240 appears to the VM 200 to be a standard SCSI disk connected to a standard SCSI adapter, whereas the underlying, actual, physical disk 140 may be something else. In this case, a standard SCSI driver is installed into the guest OS 220 as one of the drivers 224. The device emulator 330 then interfaces with the driver 224 and handles disk operations for the VM 200. The device emulator 330 then converts the disk operations from the VM 200 to corresponding disk operations for the physical disk 140.

Virtual and Physical Memory

As in most modern computers, the address space of the memory 130 is partitioned into pages (for example, in the x86 architecture) or other analogous units. Applications then address the memory 130 using virtual addresses (VAs), which include virtual page numbers (VPNs). The VAs are then mapped to physical addresses (PAs) that are used to address the physical memory 130. (VAs and PAs have a common offset from a base address, so that only the VPN needs to be converted into a corresponding physical page number (PPN).) The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, California, 1994, pp. 579-603 (chapter 7.4 "Virtual Memory"). Similar mappings are used in other architectures where relocatability is possible.

An extra level of addressing indirection is typically implemented in virtualized systems in that a VPN issued by an application 260 in the VM 200 is remapped twice in order to determine which page of the hardware memory is intended. The first mapping is provided by a mapping module within the guest OS 220, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory must ultimately be generated. A memory management module 350, typically located in the VMM 300, therefore performs the second mapping by taking the GPPN issued by the guest OS 220 and mapping it to a hardware (or "machine") page number PPN that can be used to address the hardware memory 130. This GPPN-to-PPN mapping may instead be done in the main system-level software layer (such as in a mapping module in a kernel 600, which is described below), depending on the implementation. From the perspective of the guest OS, the GVPN and GPPN might be virtual and physical page numbers just as they would be if the guest OS were the only OS in the system. From the perspective of the system software, however, the GPPN is a page number that is then mapped into the physical memory space of the hardware memory as a PPN.

System Software Configurations in Virtualized Systems

In some systems, such as the Workstation product of VMware, Inc., of Palo Alto, California, the VMM is co-resident at system level with a host operating system. Both the VMM and the host OS can independently modify the state of the host processor, but the VMM calls into the host OS via a driver and a dedicated user-level application to have the host OS perform certain I/O operations on behalf of the VM. The virtual computer in this configuration is thus fully hosted in that it runs on an existing host hardware platform and together with an existing host OS.

In other implementations, a dedicated kernel takes the place of and performs the conventional functions of the host OS, and virtual computers run on the kernel. FIG. 1 illustrates a kernel 600 that serves as the system software for several VM/VMM pairs 200/300, . . . , 200N/300N. Compared with a system in which VMMs run directly on the hardware platform, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs. The ESX Server product of VMware, Inc., has such a configuration. The invention described below takes advantage of the ability to optimize a kernel as a platform for virtual computers.

A kernel-based virtualization system of the type illustrated in FIG. 1 is described in U.S. patent application Ser. No. 09/877,378 ("Computer Configuration for Resource Management in Systems Including a Virtual Machine"), which is incorporated here by reference. The main components of this system and aspects of their interaction are, however, outlined below.

At boot-up time, an existing operating system 420 may be at system level and the kernel 600 may not yet even be operational within the system. In such case, one of the functions of the OS 420 may be to make it possible to load the kernel 600, after which the kernel runs on the native hardware 100 and manages system resources. In effect, the kernel, once loaded, displaces the OS 420. Thus, the kernel 600 may be viewed either as displacing the OS 420 from the system level and taking this place itself, or as residing at a "sub-system level." When interposed between the OS 420 and the hardware 100, the kernel 600 essentially turns the OS 420 into an "application," which has access to system resources only when allowed by the kernel 600. The kernel then schedules the OS 420 as if it were any other component that needs to use system resources.

The OS 420 may also be included to allow applications unrelated to virtualization to run; for example, a system administrator may need such applications to monitor the hardware 100 or to perform other administrative routines. The OS 420 may thus be viewed as a "console" OS (COS). In such implementations, the kernel 600 preferably also includes a remote procedure call (RPC) mechanism to enable communication between, for example, the VMM 300 and any applications 430 installed to run on the COS 420.

Actions

In kernel-based systems such as the one illustrated in FIG. 1, there must be some way for the kernel 600 to communicate with the VMM 300. In general, the VMM 300 can call into the kernel 600 but the kernel cannot call directly into the VMM. The conventional technique for overcoming this is for the kernel to post "actions" (requests for the VMM to do something) on an action queue stored in memory 130. As part of the VMM code, the VMM looks at this queue periodically, and always after it returns from a kernel call and also before it resumes a VM. One typical action is the "raise interrupt" action: If the VMM sees this action it will raise an interrupt to the VM 200 in the conventional manner.

As is known, for example, from U.S. Pat. No. 6,397,242 (Devine, et al., 28 May 2002), some virtualization systems allow VM instructions to run directly (in "direct execution") on the hardware CPU(s) when possible. When necessary, however, VM execution is switched to the technique known as "binary translation," during which the VM is running in the VMM. In any systems where the VM is running in direct execution when it becomes necessary for the VMM to check actions, the kernel must interrupt the VMM so that it will stop executing VM instructions and check its action queue. This may be done using known programming techniques.

Worlds

The kernel 600 handles not only the various VMM/VMs, but also any other applications running on the kernel, as well as the COS 420 and even the hardware CPU(s) 110, as entities that can be separately scheduled. In this disclosure, each schedulable entity is referred to as a "world," which contains a thread of control, an address space, machine memory, and handles to the various device objects that it is accessing. Worlds are stored in a portion of the memory space controlled by the kernel. More specifically, the worlds are controlled by a world manager, represented in FIG. 1 within the kernel 600 as module 612. Each world also has its own task structure, and usually also a data structure for storing the hardware state currently associated with the respective world.

There will usually be different types of worlds: 1) system worlds, which are used for idle worlds, one per CPU, and a helper world that performs tasks that need to be done asynchronously; 2) a console world, which is a special world that runs in the kernel and is associated with the COS 420; and 3) virtual machine worlds.

Worlds preferably run at the most-privileged level (for example, in a system with the x86 architecture, this will be level CPL0), that is, with full rights to invoke any privileged CPU operations. A VMM, which, along with its VM, constitutes a separate world, therefore may use these privileged instructions to allow it to run its associated VM so that it performs just like a corresponding "real" computer, even with respect to privileged operations.

Switching Worlds

When the world that is running on a particular CPU (which may be the only one) is preempted by or yields to another world, then a world switch has to occur. A world switch involves saving the context of the current world and restoring the context of the new world such that the new world can begin executing where it left off the last time that it was running.

The first part of the world switch procedure that is carried out by the kernel is that the current world's state is saved in a data structure that is stored in the kernel's data area. Assuming the common case of an underlying x86 architecture, the state that is saved will typically include: 1) the exception flags register; 2) general purpose registers; 3) segment registers; 4) the instruction pointer (EIP) register; 5) the local descriptor table register; 6) the task register; 7) debug registers; 8) control registers; 9) the interrupt descriptor table register; 10) the global descriptor table register; and 11) the floating point state. Similar state information will need to be saved in systems with other hardware architectures.

After the state of the current world is saved, the state of the new world can be restored. During the process of restoring the new world's state, no exceptions are allowed to take place because, if they did, the state of the new world would be inconsistent upon restoration of the state. The same state that was saved is therefore restored. The last step in the world switch procedure is restoring the new world's code segment and instruction pointer (EIP) registers.

When worlds are initially created, the saved state area for the world is initialized to contain the proper information such that when the system switches to that world, then enough of its state is restored to enable the world to start running. The EIP is therefore set to the address of a special world start function. Thus, when a running world switches to a new world that has never run before, the act of restoring the EIP register will cause the world to begin executing in the world start function.

Switching from and to the COS world requires additional steps, which are described in U.S. patent application Ser. No. 09/877,378, mentioned above. Understanding the details of this process is not necessary for understanding the present invention, however, so further discussion is omitted.

Memory Management in Kernel-Based System

The kernel 600 includes a memory management module 616 that manages all machine memory that is not allocated exclusively to the COS 420. When the kernel 600 is loaded, the information about the maximum amount of memory available on the machine is available to the kernel, as well as information about how much of it is being used by the COS. Part of the machine memory is used for the kernel 600 itself and the rest is used for the virtual machine worlds.

Virtual machine worlds use machine memory for two purposes. First, memory is used to back portions of each world's memory region, that is, to store code, data, stacks, etc. For example, the code and data for the VMM 300 is backed by machine memory allocated by the kernel 600. Second, memory is used for the guest memory of the virtual machine. The memory management module may include any algorithms for dynamically allocating memory among the different VM's 200.

Interrupt and Exception Handling in Kernel-Based Systems

Interrupt and exception handling is related to the concept of "worlds" described above. As mentioned above, one aspect of switching worlds is changing various descriptor tables. One of the descriptor tables that is loaded when a new world is to be run is the new world's IDT. The kernel 600 therefore preferably also includes an interrupt/exception handler 655 that is able to intercept and handle (using a corresponding IDT in the conventional manner) interrupts and exceptions for all devices on the machine. When the VMM world is running, whichever IDT was previously loaded is replaced by the VMM's IDT, such that the VMM will handle all interrupts and exceptions.

The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as the COS. One example of an interrupt that the VMM can handle completely on its own, with no call to the kernel, is a check-action IPI (inter-processor interrupt). One example of when the VMM preferably calls the kernel, which then forwards an interrupt to the COS, would be where the interrupt involves devices such as a mouse, which is typically controlled by the COS. The VMM may forward still other interrupts to the VM.

Device Access in Kernel-Based System

In some embodiments of the invention, the kernel 600 is responsible for providing access to all devices on the physical machine. In addition to other modules that the designer may choose to load onto the system for access by the kernel, the kernel will therefore typically load conventional drivers as needed to control access to devices. Accordingly, FIG. 1 shows a module 610 containing loadable kernel modules and drivers. The kernel 600 may interface with the loadable modules and drivers in a conventional manner, using an application program interface (API) or similar interface.

Example Virtual Computer System

FIG. 2 shows one possible configuration for the generalized virtual computer system 700 of FIG. 1, which is useful for describing the invention. Thus, FIG. 2 shows a virtual computer system 700A that includes four VMs, namely a VM-1 200A, a VM-2 200B, a VM-3 200C and a VM-4

200D. Each of the VMs 200A, 200B, 200C and 200D may be based on a common x86 architecture (For reference, see documents related to the Intel IA-32 architecture, for example), for example, and each of the VMs is loaded with a guest OS and a set of one or more applications. Thus, the VM-1 200A is loaded with a first guest OS 220A and a first set of applications 260A, the VM-2 200B is loaded with a second guest OS 220B and a second set of applications 260B, the VM-3 200C is loaded with a third guest OS 220C and a third set of applications 260C, and the VM-4 200D is loaded with a fourth guest OS 220D and a fourth set of applications 260D. The guest OSs 220A, 220B, 220C and 220D may be any combination of supported OSs, ranging from all four of the OSs being the same OS to each of the OSs being a different OS. For example, the guest OS 220A may be a Windows Server 2003 OS from Microsoft Corp., the guest OS 220B may be a Linux distribution from Red Hat, Inc., the guest OS 220C may be a Solaris OS from Sun Microsystems, Inc., and the guest OS 220D may also be the Windows Server 2003 OS from Microsoft Corp. The applications 260A, 260B, 260C and 260D may be any combination of supported applications, possibly with some applications being common to multiple VMs.

The VM-1 200A is supported by a first VMM 300A, the VM-2 200B is supported by a second VMM 300B, the VM-3 200C is supported by a third VMM 300C, and the VM-4 200D is supported by a fourth VMM 300D. Each of the VMMs 300A, 300B, 300C and 300D may be substantially the same as the VMM 300 described above in connection with FIG. 1. Thus, in particular, each of the VMMs 300A, 300B, 300C and 300D may include the interrupt handler 355, the device emulators 330 and the memory management unit 350 that are illustrated in FIG. 1. All of the VMMs 300A, 300B, 300C and 300D are supported by the same kernel 600 that was illustrated in FIG. 1 and that was partially described above, including the memory management unit 616, the world manager 612 and the interrupt/exception handler 655. The virtual computer system 700A of FIG. 2 also includes the set of loadable modules and drivers 610 that were illustrated in FIG. 1, along with the system hardware 100. The virtual computer system 700A of FIG. 2 may also include the console OS 420 and the applications 430 shown in FIG. 1, although these units are not shown in FIG. 2 for simplicity.

FIG. 2 also shows the virtual computer system 700A being connected to one or more computer networks 20 by a first network interface card (NIC) 180A and a second NIC 180B. The network(s) 20 may be a simple network, such as a local area network (LAN) based on any of a variety of networking technologies, or it may be an interconnection of multiple networks using one or more networking technologies, including zero or more LANs and zero or more wide area networks (WANs). The NICs 180A and 180B are appropriate for the system hardware 100 and for the network(s) 20 to which the virtual computer system 700A is connected.

The description in this patent generally assumes the use of the popular Ethernet networking technology for simplicity, although it may also be applied to other networking technologies, including other layer 2 technologies of the Open System Interconnection (OSI) model. There are numerous books available on Ethernet technology and a large variety of other networking and internetworking technologies. In this patent, the word Ethernet is generally used to refer to any of the variations of Ethernet technology, including, in particular, the standard IEEE (Institute of Electrical and Electronics Engineers, Inc.) 802.3 interfaces operating at 1 megabit per second (Mbps), 10 Mbps, 100 Mbps, 1 gigabit per second (Gbps) and 10 Gbps. Thus, if the network 20 is an Ethernet network, then the NICs 180A and 180B are Ethernet cards that are compatible with the system hardware 100. The system hardware 100 may constitute a conventional server computer based on the x86 architecture, for example. In this case, the NICs 180A and 180B may be Intel PRO/100 Ethernet NICs, Intel PRO/1000 Gigabit Ethernet NICs, or various other NICs, including possibly a combination of different types of NICs from the same or from different manufacturers.

In general terms, the virtual computer system 700A comprises virtualization software that supports the VMs 200A, 200B, 200C and 200D and enables the VMs to operate within the system hardware 100 and to utilize the resources of the system hardware. In the particular virtual computer system illustrated in FIG. 2, the virtualization software comprises the kernel 600, the loadable modules and drivers 610 and the VMMs 300A, 300B, 300C and 300D. In other virtual computer systems, the virtualization software may comprise other software modules or other combinations of software modules. Of particular relevance to this invention, the virtualization software in the virtual computer system 700A of FIG. 2 enables the VMs 200A, 200B, 200C and 200D to access the computer network(s) 20 through the NICs 180A and 180B. A similar virtual computer system that enabled VMs to access computer networks through physical NIC(s) of a physical computer system was described in U.S. patent application Ser. No. 10/665,779, entitled "Managing Network Data Transfers in a Virtual Computer System" (the '779 application), which is incorporated here by reference. The virtualization software of the virtual computer system 700A may be substantially the same as corresponding software modules of the virtual computer system described in the '779 application, except as described below.

Similar to the virtual computer system of the '779 application, FIG. 2 shows two NIC drivers 680A and 680B in the modules and drivers 610. The NIC driver 680A operates as a driver for the NIC 180A and the NIC driver 680B operates as a driver for the NIC 180B. Each of the NIC drivers 680A and 680B may be substantially the same as a conventional, basic NIC driver for the corresponding NIC 180A or 180B. The NIC drivers 680A and 680B are specific to the particular types of NICs used as the NICs 180A and 180B, respectively. If the two NICs are of the same type, then the corresponding NIC drivers may be separate instances of the same NIC driver. For example, for a Linux platform, if the NICs are both Intel PRO/100 Ethernet NICs, then the NIC drivers may be separate instances of the e100 driver from Intel. As is well known, the NIC drivers control the NICs, and provide an interface with the NICs. In other implementations of this invention, there may be a larger number of NICs 180 and corresponding NIC drivers 680, or there could be a smaller number of each.

One of the device emulators 330 (see FIG. 1) within each of the VMMs 300A, 300B, 300C and 300D emulates one or more NICs to create virtual NICs for the VMs 200A, 200B, 200C and 200D. Thus, in the virtual computer system of FIG. 2, a device emulator 330 within the VMM 300A supports a virtual NIC 280A for the VM 200A, a device emulator 330 within the VMM 300B supports a virtual NIC 280B for the VM 200B, a device emulator 330 within the VMM 300C supports a virtual NIC 280C for the VM 200C, and a device emulator 330 within the VMM 300D supports a first virtual NIC 280D for the VM 200D and a second virtual NIC 280E for the VM 200D. The device emulators 330 preferably emulate the NICs in such a way that software within the VMs 200A, 200B, 200C and 200D, as well as a user of the VMs, cannot tell that the virtual NICs 280A, 280B, 280C, 280D and 280E are not actual, physical NICs. Techniques for emulating a NIC in this manner are well known in the art. The virtual NICs 280A, 280B, 280C, 280D and 280E may all be generic NICs, they may all be specific NICs, such as Intel PRO/100 Ethernet NICs, for example, or they may be a combination of generic NICs and/or specific NICs of one or more different types.

The virtual NICs are preferably widely supported NICs, having drivers available for a large number and variety of OSs, such as the PCnet Lance Ethernet driver, from Advanced Micro Devices, Inc., which is built into all OSs that are common at this time. A NIC driver that is appropriate for each of the virtual NICs and the corresponding guest OSs is loaded as one of the drivers 224 (see FIG. 1), if it is not already resident in the corresponding guest OS. Thus, a NIC driver 281A that is appropriate for the virtual NIC 280A and the guest OS 220A is loaded as a driver 224 in the VM 200A, a NIC driver 281B that is appropriate for the virtual NIC 280B and the guest OS 220B is loaded as a driver 224 in the VM 200B, a NIC driver 281C that is appropriate for the virtual NIC 280C and the guest OS 220C is loaded as a driver 224 in the VM 200C, and a NIC driver 281D that is appropriate for the virtual NICs 280D and 280E and the guest OS 220D is loaded as a driver 224 in the VM 200D. Here, the virtual NICs 280D and 280E are assumed to be of the same type for simplicity, so that the corresponding NIC drivers may be separate instances of the same NIC driver 281D, although the virtual NICs 280D and 280E may alternatively be of different types, requiring different NIC drivers. The NIC drivers 281A, 281B, 281C and 281D may be standard NIC drivers for use with the corresponding emulated virtual NICs 280A, 280B, 280C, 280D and 280E, or they may be custom NIC drivers that are optimized for the virtual computer system 700A.

From the perspective of the guest OSs 220A, 220B, 220C and 220D, the guest applications 260A, 260B, 260C and 260D, and the users of any of this guest software, the respective VMs 200A, 200B, 200C and 200D preferably appear to be conventional physical computers, and the virtual NICs 280A, 280B, 280C, 280D and 280E preferably appear to be conventional physical NICs connected to the network(s) 20. Thus, guest software and/or users of the guest software may attempt to communicate with other computers over the network(s) 20 in a conventional manner. For example, the VM 200A may implement an email server that is accessible through the network(s) 20. A client computer attached to the network(s) 20 may communicate with the VM 200A to retrieve email messages, and the VM 200A may respond, as appropriate. These communications would involve one or more incoming network data frames that would arrive from the client computer at one or both of the NICs 180A and 180B and that must be forwarded to the VM 200A, along with one or more outgoing network data frames that would be sent out by the VM 200A and that must be transmitted to the client computer through one or both of the NICs 180A and 180B. One of the functions of the virtualization software of the virtual computer system 700A is to facilitate these communications by the VMs 200A, 200B, 200C and 200D over the network(s) 20 by conveying incoming and outgoing network data frames between the VMs and the physical NICs 180A and 180B.

As described in the '779 application, a NIC manager 642 plays an important role in enabling software entities within the virtual computer system 700A to communicate over the network(s) 20. In FIG. 2, the NIC manager 642 is shown as being implemented within the kernel 600, although the NIC manager 642 may alternatively be implemented as a driver within the modules and drivers 610. Thus, the NIC manager 642 receives outgoing network data frames, from the VMs 200A, 200B, 200C and 200D and forwards them to the NIC drivers 680A and 680B for transmission onto the network by the respective NICs 180A and 180B. The NIC manager 642 also receives incoming network data frames from the NICs, through the NIC drivers, and routes them to the appropriate destinations, such as the VMs 200A, 200B, 200C and 200D, based on the layer 2 and/or layer 3 destination address(es) contained in the data frames. For example, for internet protocol (IP) data over an Ethernet network, the NIC manager 642 routes the data frames based on the medium access control (MAC) address and/or the IP address.

When a software entity within one of the VMs 200A, 200B, 200C or 200D wants to send an outgoing data frame to the network(s) 20, the data frame is sent to the respective NIC driver 281A, 281B, 281C or 281D, so that the respective NIC driver can send the data frame onto the network(s) 20 using the respective virtual NIC 280A, 280B, 280C, 280D or 280E, with the virtual NICs appearing to be connected directly to the network(s) 20. Instead of going directly out onto the network(s) 20, however, the data frame is first forwarded to the NIC manager 642. As an example, a software entity within the VM 200A may send an outgoing data frame to the NIC driver 281A for transmission on the network(s) 20. This data frame is forwarded from the NIC driver 281A to the NIC manager 642. This forwarding of data frames can be accomplished in a variety of ways. For example, if the virtual NIC 280A emulated by the device emulator 330 (see FIG. 1) is a standard NIC that provides direct memory access (DMA) capabilities, and the NIC driver 281A (see FIG. 2) is a standard NIC driver for that particular type of NIC, then the NIC driver 281A attempts to set up the NIC 280A to perform a DMA transfer of the data frame. The device emulator 330 responds by communicating with the NIC driver 281A and performing the transfer of data, making it appear to the NIC driver 281A that the virtual NIC 280A performed the DMA transfer, as expected. The emulator 330 then provides the data frame to the NIC manager 642 for routing through one of the NIC drivers 680A and 680B and the corresponding NIC 180A or 180B onto the network. For example, the emulator 330 may copy the data frame from a memory page that is controlled by the VM 200A to a memory page that is controlled by the kernel 600, and which is accessible to the NIC manager 642, and, more particularly, to the NIC drivers 680A and 680B.

Similarly, for an incoming data frame to the VM 200A, the NIC manager 642 receives the data frame from one of the NIC drivers 680A or 680B and forwards the data frame to the device emulator 330 within the VMM 300A. The device emulator 330 places the data frame in an appropriate location in memory and generates an appropriate interrupt to the guest OS 220A to cause the NIC driver 281A to retrieve the data frame from memory. A person of skill in the art will understand how to emulate the virtual NICs 280A, 280B, 280C, 280D and 280E in this manner to facilitate the transfer of data frames between the NIC drivers 281A, 281B, 281C and 281D and the NIC manager 642. A person of skill in the art will also understand how to minimize the number of times that data frames are copied in transferring data between the NIC drivers 281A, 281B, 281C and 281D and the network(s) 20, depending on the particular implementation. For example, for an outgoing data frame, it may be possible to set up the physical NICs 180A and 180B to perform DMA transfers directly from the NIC drivers 281A, 281B, 281C and 281D, to avoid any unnecessary copying of the data.

For this description, suppose that the virtual computer system 700A is connected to an Ethernet network and that each of the physical NICs 180A and 180B and each of the virtual NICs 280A, 280B, 280C, 280D and 280E are Ethernet cards. In this case, each of the virtual NICs 280A, 280B, 280C, 280D and 280E preferably has a MAC address that is unique, at least within the virtual computer system 700A, and preferably also within the local network to which the virtual computer system 700A is connected. Then, for example, any outgoing data frames from the VM 200A will contain the MAC address of the virtual NIC 280A in the source address field of the Ethernet frame, and any incoming data frames for the VM 200A will contain the same MAC address, or a broadcast or multicast address, in the destination address field of the Ethernet frame. Each of the NICs 180A and 180B may be placed in a promiscuous mode, which causes the NICs to receive all incoming data frames and forward them to the respective NIC drivers 680A and 680B, even if they don't contain the MAC address of the respective NIC. This ensures that the NIC manager 642 receives data frames containing the MAC address of each of the virtual NICs 280A, 280B, 280C, 280D and 280E. The NIC manager 642 then routes incoming data frames to the appropriate VMs 200A, 200B, 200C and 200D, based on the MAC address that is contained in the destination field of the Ethernet frame. The NIC manager 642 is generally able to transmit data frames from the VMs 200A, 200B, 200C and 200D through the NICs 180A and 180B, using the MAC address of the respective virtual NIC 280A, 280B, 280C, 280D or 280E within the source field of the Ethernet frame. In other words, the physical NICs 180A and 180B generally transmit outgoing data frames onto the network, even if the data frames do not contain the MAC address of the physical NICs in the source address field.

Incoming data frames may also be routed to other destinations within the virtual computer system 700A, such as to an application 430 (see FIG. 1), as appropriate. Similarly, other entities within the virtual computer system 700A may generate outgoing data frames for transmission on the attached network. For example, on behalf of an application 430, a NIC driver within the COS 420 (see FIG. 1 again), possibly in coordination with the NIC manager 642, may insert the MAC address of one of the NICs 180A or 180B into the source field of the Ethernet header of an outgoing data frame. Then, responsive incoming data frames destined for the application 430 will contain the same MAC address, or a broadcast or multicast address, in the destination field of the Ethernet frame. Using these techniques, the NIC drivers 281A, 281B, 281C and 281D within the guest OSs 220A, 220B, 220C and 220D, the NIC driver within the COS 420, the virtual NICs 280A, 280B, 280C, 280D and 280E, the device emulators 330, the NIC manager 642, the NIC drivers 680A and 680B, and the physical NICs 180A and 180B are able to transfer both incoming data frames and outgoing data frames between numerous different software entities within the virtual computer system 700A and numerous different software entities on the network.

One of the primary functions of the NIC manager 642 is to decide which outgoing data frames will be routed over each of the physical NICs 180A and 180B. As described in the '779 application, the NIC manager 642 operates in coordination with a VM manager 660 and a resource manager 662, which are additional units of the kernel 600, as illustrated in FIG. 2. The VM manager 660 and the resource manager 662 may be combined into a single software unit or they may be implemented as separate units as illustrated in FIG. 2. The VM manager 660 and the resource manager 662 are illustrated and described as separate units herein simply because they have distinct functions. The VM manager 660 performs high-level functions related to the control and operation of the VMs 200A, 200B, 200C and 200D. For example, the VM manager 660 may initialize a new VM, suspend an active VM, terminate a VM or cause a VM to migrate to another physical computer system. The VM manager 660 may perform these actions in response to a variety of stimuli or conditions, such as in response to commands from a system administrator at a control console, in response to conditions within a VM or in response to other conditions within the virtual computer system 700A.

The resource manager 662 generally allocates system resources between the multiple VMs 200A, 200B, 200C and 200D, as well as between the other worlds within the virtual computer system. For example, the resource manager 662 schedules and manages access to the CPU(s), the memory, the network resources and any accessible data storage resources. The resource manager 662 may allow a system administrator to specify various levels of service that are to be provided to each of the VMs for each of the system resources. For example, an application 430 running on the COS 420 (see FIG. 1) may provide a user interface to a system administrator, enabling the system administrator to control numerous system parameters, including the levels of service of system resources for the multiple VMs 200A, 200B, 200C and 200D. The resource manager 662 then works with other units within the computer system 700A to provide the requested levels of service.

The NIC manager 642 preferably obtains and evaluates a variety of NIC management information and VM-specific information received from the VM manager 660, the resource manager 662 and other sources, in deciding whether a data frame is to be transferred onto the network(s) 20, queued for transferring at a later time, or discarded; and, if a decision is made to transfer the data frame, the NIC manager 642 also decides over which NIC 180A or 180B the data frame is to be transferred.

As also described in the '779 application, the NIC manager 642 preferably provides NIC teaming capabilities such as failover and failback functions, along with a load distribution function, when making these decisions. A wide variety of algorithms may be implemented in making data frame routing decisions. One such algorithm involves sending outgoing data frames from each VM in the virtual computer system over a different physical NIC. For example, if there are two VMs in the system and two physical NICs, one VM's data frames would be routed over the first physical NIC and the other VM's data frames would be routed over the other physical NIC. As described in the '779 application, such an algorithm provides greater isolation between the operation of the different VMs in the system. This algorithm is not possible, however, in many virtual computer systems, because the number of VMs in such systems exceeds the number of physical NICs in the systems. For example, in the virtual computer system 700A of FIG. 2, there are four VMs 200A, 200B, 200C and 200D, but only two physical NICs 180A and 180B. In this case, there is no way to give each VM in the system its own physical NIC.

Suppose in the virtual computer system 700A of FIG. 2 that the NIC manager 642 is configured to route data frames from the VM-1 200A and the VM-2 200B through the first physical NIC 180A and to route data frames from the VM-3

200C and the VM-4 200D through the second physical NIC 180B. In this case, the VM-1 200A and the VM-2 200B are sharing the first physical NIC 180A, while the VM-3 200C and the VM-4 200D are sharing the second physical NIC 180B. The NIC manager 642 may also restrict incoming data frames in a similar way, so that, if an incoming broadcast data frame is received at the first NIC 180A but not at the second NIC 180B (for example, if the NICs are connected to different networks), then the data frame is delivered to the VM-1 200A and the VM-2 200B, but not to the VM-3 200C or the VM-4 200D. Although using this algorithm improves the isolation between some of the VMs, each of the physical NICs 180A and 180B is still shared between multiple VMs. As another alternative, suppose that a critical application requiring consistent, reliable network access is executing in the VM-1 200A. In this case, the physical NIC 180A may be dedicated for use by the VM-1 200A, while the other VMs 200B, 200C and 200D all use the other physical NIC 180B for network access. This algorithm improves the isolation of the VM-1 200A, but the remaining VMs must still share a physical NIC.

This sharing of physical NICs causes a possible security risk, with the degree of risk varying, depending on the implementation and use of the virtual computer system. For example, suppose that a first VM in a virtual computer system is afflicted with a virus or some other malicious software while a second VM is running an important application. Or, even worse, suppose that the first VM is being actively used by a sophisticated hacker while an important application is running in the second VM. Any ability within the first VM to tap into the network traffic of the second VM increases the risk of compromising the second VM.

The same risk of sharing NICs also exists if the NIC manager 642 implements other algorithms for routing data frames between the VMs 200A, 200B, 200C and 200D and the physical NICs 180A and 180B, likely to an even greater extent. For example, if the NIC manager 642 implements a "round robin" algorithm, so that outgoing data frames from all of the VMs are sent alternately over the first NIC 180A and the second NIC 180B, each of the VMs 200A, 200B, 200C and 200D uses both of the NICs 180A and 180B. The NIC manager 642 must generally forward incoming broadcast data frames received at either of the NICs 180A or 180B to all of the VMs 200A, 200B, 200C and 200D. In this case, all of the VMs in the system will have some access to the network traffic of each of the other VMs.

What is needed, therefore, is a technique for improving the isolation between the network traffic of multiple VMs in a virtual computer system, where the number of VMs in the system exceeds the number of physical NICs in the system.

SUMMARY OF THE INVENTION

The invention comprises a method that is performed in a virtual computer system. The virtual computer system may comprise virtualization software that supports a first virtual machine (VM) and a second VM. The virtualization software may provide the first VM with a first virtual network interface for accessing a first computer network through a first physical network interface and it may provide the second VM with a second virtual network interface for accessing a second computer network through a second physical network interface. The method comprises: receiving outgoing network data frames from the first VM at the first virtual network interface and writing a first VLAN identifier into the outgoing network data frames before conveying the outgoing network data frames to the first computer network through the first physical network interface; receiving outgoing network data frames from the second VM at the second virtual network interface and writing a second VLAN identifier into the outgoing network data frames before conveying the outgoing network data frames to the second computer network through the second physical network interface; receiving incoming network data frames from the first computer network through the first physical network interface and, for those incoming network data frames that include the first VLAN identifier, removing the first VLAN identifier from the incoming network data frames and conveying the incoming network data frames to the first VM through the first virtual network interface; and receiving incoming network data frames from the second computer network through the second physical network interface and, for those incoming network data frames that include the second VLAN identifier, removing the second VLAN identifier from the incoming network data frames and conveying the incoming network data frames to the second VM through the second virtual network interface.

The invention also comprises a software module containing computer executable code for operating in a virtual computer system. The virtual computer system may comprise a physical computer on which the software module executes, a physical network interface for providing access to one or more computer networks, and a virtualization software also executing on the physical computer. The virtualization software may support a first virtual machine (VM) and a second VM that also operate in the virtual computer system. The virtualization software may provide a first virtual network interface to the first VM to provide the first VM with access to one or more of the computer networks through the physical network interface. The virtualization software may also provide a second virtual network interface to the second VM to provide the second VM with access to one or more of the computer networks through the physical network interface. The software module comprises computer executable code operating to restrict the network access of the first VM to a first virtual local area network (VLAN) and to restrict the network access of the second VM to a second VLAN. The executable code further comprises: a first set of code that writes a first VLAN identifier for the first VLAN into outgoing network data frames from the first VM after the outgoing data frames are received by the virtualization software from the first virtual network interface and that writes a second VLAN identifier for the second VLAN into outgoing network data frames from the second VM after the outgoing data frames are received by the virtualization software from the second virtual network interface; and a second set of code that prevents incoming network data frames from reaching the first VM unless they include the first VLAN identifier and that prevents incoming network data frames from reaching the second VM unless they include the second VLAN identifier.

DETAILED DESCRIPTION

The invention relates to managing data transfers between a virtual computer system and a computer network. The virtual computer system may be any of a wide variety of virtual computer systems implemented in any of a wide variety of physical computer systems. The computer network may be any of a wide variety of computer networks, including a combination of various types of networks. The physical computer system is connected to the computer network by one or more NICs, or other devices for connecting a physical computer system to a computer network. The invention is described below in one particular embodiment, but it can also be implemented in a wide variety of other embodiments.

Figure 1:
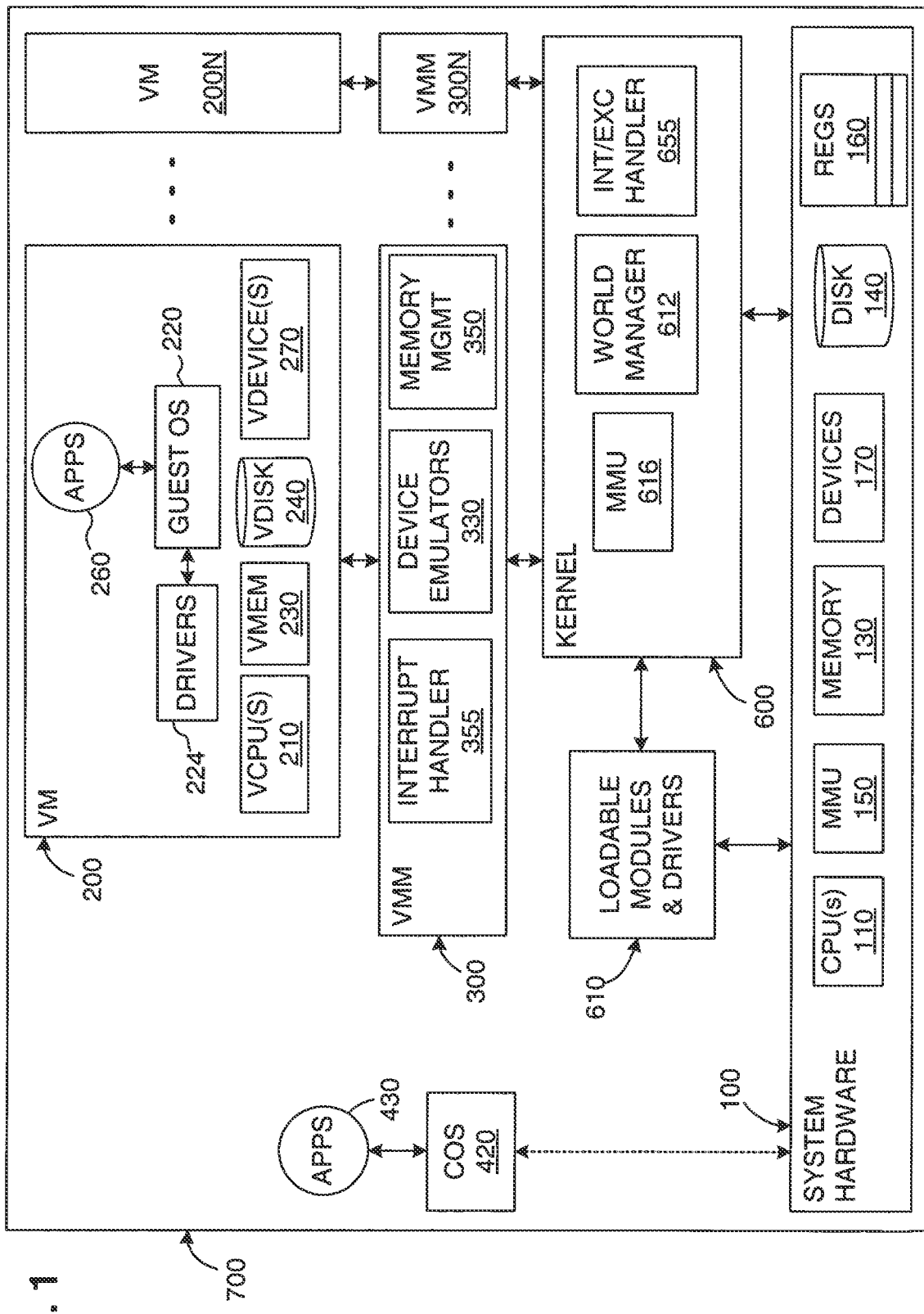
FIG. 1 illustrates the main components of a generalized, kernel-based, virtual computer system.
Figure 2:
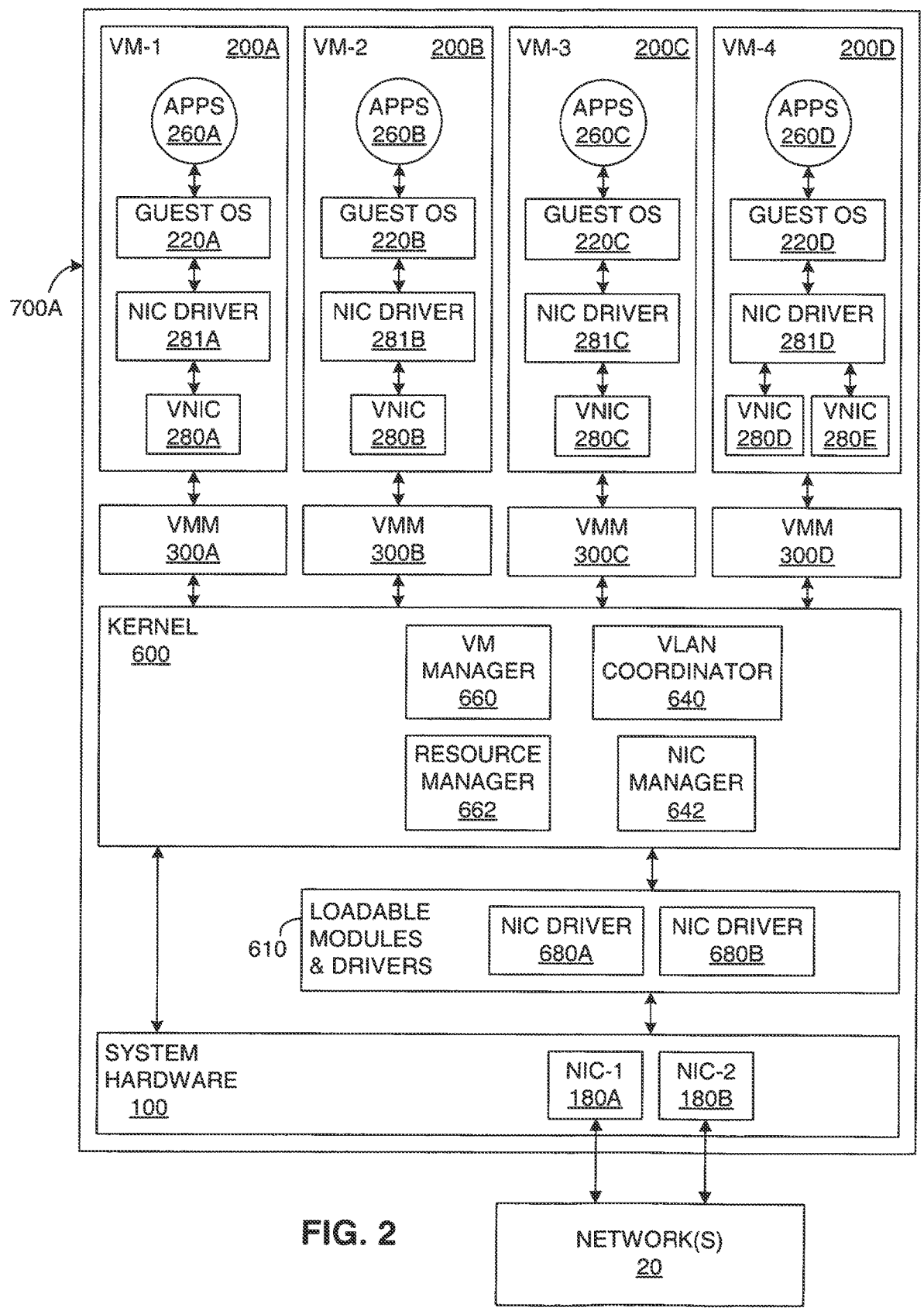
FIG. 2 illustrates selected components of a more specific implementation of the virtual computer system of FIG. 1, where the virtual computer system is connected to one or more data networks by a pair of network interface cards.

The invention comprises adding a VLAN coordinator 640, as illustrated in FIG. 2, or some other functionally comparable software module, to a virtual computer system. Alternatively, the functionality of the VLAN coordinator 640 may be implemented at least partially in hardware. Also, the VLAN coordinator 640 is represented as a discrete unit within the kernel 600 to distinguish its functionality from other functions performed by software modules within the kernel 600. The functions of the VLAN coordinator 640 may be performed by a discrete software module or by a software module that also performs some other function(s) within the kernel 600 or within some other virtualization software. The VLAN coordinator 640 may be integrated into the kernel 600 or other virtualization software, or it may be a separate module that is added to the virtualization software, possibly as one of the loadable modules and drivers 610.

The VLAN coordinator 640 places one or more of the VMs in a virtual computer system onto one or more VLANs. For example, for current Ethernet networks, the VLAN coordinator 640 may use VLANs according to the IEEE 802.1Q standard for "Virtual Bridged Local Area Networks." The invention is described below in relation to the IEEE 802.1Q implementation of VLANs, although it also applies to other possible implementations. For the following description, a person of skill in the art is assumed to have a working knowledge of the IEEE 802.1Q standard and related technologies. A reader should refer to that standard, as needed, as well as to numerous other books and other documents related to the IEEE 802.1Q standard and related technologies.

The VLAN coordinator 640 may place VMs on particular VLANs in coordination with the respective VMs, or without any coordination. The VLAN coordinator 640 may isolate VMs to particular VLANs without any software on the VMs or any user of the VMs even "knowing" of the operation of the VLAN coordinator 640. The software on the VMs or users of the VMs may not realize that the local networks to which the VMs are connected are virtual networks instead of real, physical networks. The possibilities for implementing the VLAN coordinator 640 vary widely and the possibilities for how the VLAN coordinator 640 implements VLANs in a virtual computer system also vary widely.

As described above, the virtual computer system 700A of FIG. 2 comprises four VMs 200A, 200B, 200C and 200D connected to one or more networks 20 by a pair of physical NICs 180A and 180B. Each of the VMs includes one or more virtual NICs 280A, 280B, 280C, 280D and 280E. Software entities within each of the VMs may use their respective virtual NIC(s) to communicate over the network(s) 20, as if the virtual NICs were connected directly to the networks. The virtualization software within the virtual computer system 700A conveys outgoing network data frames from the respective NIC drivers 281A, 281B, 281C and 281D to the physical NICs 180A and 180B and it conveys incoming network data frames from the physical NICs to the respective NIC drivers. During this process, the VLAN coordinator 640 modifies the data frames as required to implement its VLAN restrictions. The IEEE 802.1Q standard, for example, specifies an optional VLAN identifier field that may be added to a data frame to indicate a VLAN to which the data frame's transmission is to be limited. The VLAN coordinator 640 controls the VLANs to which the VMs belong by adding VLAN identifiers to data frames, by deleting VLAN identifiers from data frames and/or by modifying VLAN identifiers in data frames, as required, and depending on the circumstances.

As a first example, suppose that the VM-1 200A is to be placed on a first VLAN, having a VLAN identifier value of 1. Suppose further that the software within the VM-1 200A does not include a VLAN identifier in outgoing data frames. Before outgoing data frames are transmitted to the network(s) 20 over the physical NICs 180A and 180B, the VLAN coordinator 640 adds a VLAN identifier value of 1 to the outgoing data frames. Now, any outgoing data frames from the VM-1 200A will be restricted to the first VLAN. More specifically, any broadcast data frames sent out by the VM-1 200A will only be delivered to other network entities that belong to the first VLAN.

For any incoming data frames received at the NICs 180A and 180B that are to be delivered to the VM-1 200A, any VLAN identifiers in the data frames will typically be removed, because the software within the VM will not be expecting incoming data frames to contain VLAN identifiers. Also, incoming broadcast data frames will only be delivered to the software of the VM-1 200A if the data frames contain the VLAN identifier value of 1. By modifying outgoing and incoming data frames in this manner, the VLAN coordinator has effectively limited the local network of the VM-1 200A to other network entities on the first VLAN. The software in the VM-1 200A, as well as any user of the VM, need not even know, however, that the VM's local network has been restricted by the imposition of a VLAN. The only things that are seen by the guest OS 220A, for example, may be that outgoing data frames are sent to the NIC driver 281A without any VLAN identifiers and that incoming data frames are received from the NIC driver 281A without any VLAN identifiers. It may simply appear to the software within the VM-1 200A that the local physical network to which the VM is connected comprises only the network entities in the first VLAN.

Now suppose, however, that a user of the VM-1 200A, who may not even be aware that the apparent network to which the VM is connected is virtual instead of physical, attempts to place the VM on a second VLAN using the software within the VM. Perhaps the same user or a different user is also attempting to place one or more other VMs or other network entities on the second VLAN too. Thus, in effect, the users may be attempting to implement the second VLAN within the first VLAN, to include a subset of the network entities that belong to the first VLAN. Suppose therefore that the software within the VM-1 200A includes a VLAN identifier value of 2 within outgoing data frames that are sent to the NIC driver 281A. The VLAN coordinator 640 may attempt to facilitate this second VLAN within the first VLAN, depending on the implementation and the situation. Suppose, for example, that another VM on the first VLAN (either on the same physical computer or on a separate one) is also placed on the second VLAN using the software within the VM.

Now, the same virtualization software may be supporting both of these VMs, the two VMs may be supported by separate copies or instances of the same virtualization software, or the two VMs may be supported by different virtualization software. In any case, the virtualization software for the VM-1 200A and the virtualization software for the other VM may permit the VMs to implement the second VLAN if the virtualization software is the same, or if there is sufficient coordination between the virtualization software of the two VMs. For example, the VLAN coordinators 640 for each of the VMs may allow both outgoing data frames and incoming data frames that include the VLAN identifier value of 2 to pass through without modification, so that the VMs can implement their own second VLAN within the first VLAN implemented by the virtualization software. Alternatively, if the virtualization software for either of the VMs is already using the VLAN identifier value of 2 for another VLAN, the virtualization software for the two VMs may select a different VLAN identifier value to use for the second VLAN. For example, for outgoing data frames that are to be restricted to the second VLAN, each VLAN coordinator 640 may modify the VLAN identifier from a value of 2 to a value of 3 and, for incoming data frames that are restricted to the second VLAN, the VLAN coordinators may modify the VLAN identifier from a value of 3 to a value of 2. Using this approach, the two VMs believe that they have created a second VLAN using the VLAN identifier value of 2, but, on the network(s) 20, the second VLAN is still created, but with a VLAN identifier value of 3 instead of 2. This implementation may be useful, for example, in distinguishing between the use of private VLANs, using private VLAN identifiers, and public VLANs, using public VLAN identifiers. For example, private VLANs may be set up using VLAN identifier values of 4 and 5, while corresponding public VLANs are set up using VLAN identifier values of 1004 and 1005, respectively. In this case, the virtualization software would replace the VLAN identifier values of 4 and 5 of the private VLANs with the VLAN identifier values of 1004 and 1005, respectively, of the public VLANs when conveying data frames from the private VLANs to the public VLANs, and the virtualization software would replace the VLAN identifier values of 1004 and 1005 of the public VLANs with the VLAN identifier values of 4 and 5, respectively, of the private VLANs when conveying data frames from the public VLANs to the private VLANs.

The possible VLAN configurations for different virtual computer systems may vary widely too, depending on the circumstances. For example, to achieve the greatest isolation between multiple VMs in a system, it may be advantageous to place each of the VMs on a different VLAN, to minimize the amount of network traffic that each VM sees that relates to the other VMs in the system. Thus, for example, in the virtual computer system 700A of FIG. 2, the VM-1 200A may be placed on a first VLAN having a first VLAN identifier, the VM-2 200B may be placed on a second VLAN having a second VLAN identifier, the VM-3 200C may be placed on a third VLAN having a third VLAN identifier, and the VM-4 200D may be placed on a fourth VLAN having a fourth VLAN identifier.

Placing each VM in a system on a separate VLAN may mitigate the risks involved with sharing a physical NIC between multiple VMs. The added security gained by using different VLANs may justify changing the routing algorithm used by the NIC manager 642 to one that improves the throughput of the network connection. For example, suppose the NIC manager 642 of FIG. 2 is configured to use the physical NIC 180A for network traffic related to the VM-1 200A and the VM-2 200B and to use the physical NIC 180B for network traffic related to the VM-3 200C and the VM-4 200D. While this algorithm limits the sharing of physical NICs by multiple VMs in comparison to other possible algorithms, it may also be less efficient in using the potential network bandwidth provided by the physical NICs 180A and 180B. For example, at some times, the physical NIC 180A may be flooded with network traffic for the VMs 200A and 200B while the physical NIC 180B is idle and, at other times, the physical NIC 180B may be flooded with network traffic for the VMs 200C and 200D while the physical NIC 180A is idle. The physical NICs 180A and 180B would be able to provide a greater combined throughput if the network traffic were distributed more evenly over the NICs.

Now suppose instead that the NIC manager 642 routes network traffic through the NICs 180A and 180B according to a different algorithm that is more effective in balancing the load between the physical NICs, such as by sending each outgoing data frame to the NIC that has the lightest estimated load, regardless of the source of the data frame. Such an algorithm may be preferable even if it leads to more sharing of physical NICs because of the gain in throughput for the physical NICs.

There are certainly other reasons, however, why one might want to put multiple VMs on the same VLAN, whether the VMs are running on the same physical computer system or on different ones. For example, suppose that the VM-2 200B and the VM-3 200C are running applications that need to communicate with one another over the network connection. In this case, the VMs 200B and 200C may be placed on the same VLAN, while other VMs in the computer system are placed on one or more other VLANs. If desired, however, the network traffic for the VMs 200B and 200C may be split up, so that one physical NIC handles the traffic of one of the VMs and the other physical NIC handles the traffic of the other VM. Using separate NICs for the network traffic of these two VMs may tend to alleviate the added risk of putting the two NICs on the same VLAN.

There are a variety of factors, including possible network communications between VMs and the trustworthiness of the different VMs, that may lead to a wide variety of NIC usage configurations, including different algorithms for routing network traffic to the physical NICs in the computer system and selecting VLAN configurations, along with various other considerations. The NIC usage configuration of a computer system may be established by a variety of means, including giving a system administrator an ability to select or specify the various configuration parameters, such as the algorithm used by the NIC manager 642 and the VLAN configuration. Depending on the particular circumstances, a system administrator may choose an appropriate tradeoff between security risks and an efficient use of the network connection.

Figure 3:
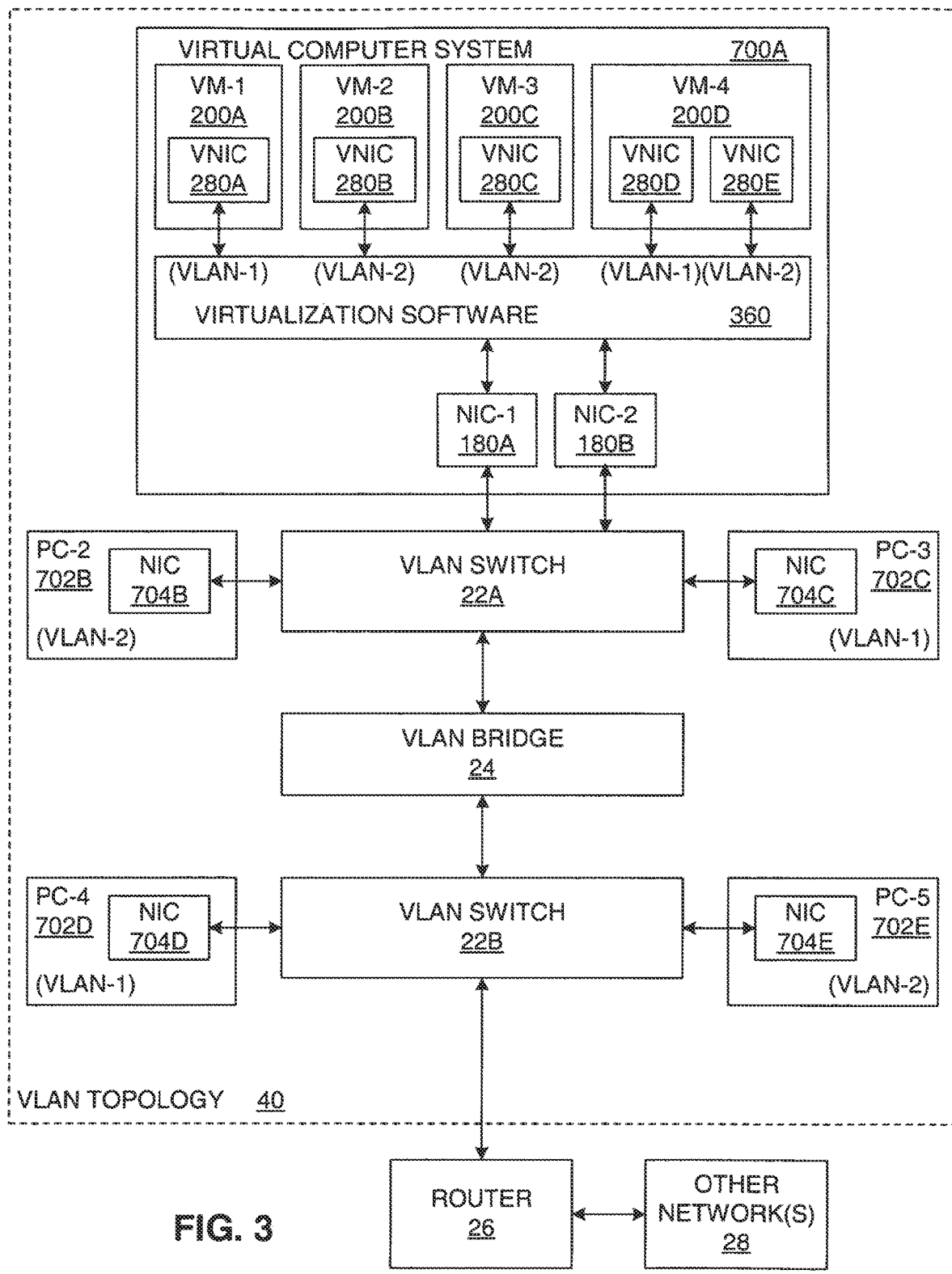
FIG. 3 illustrates the virtual computer system of FIG. 2 connected to a bridged network implementing a virtual local area network (VLAN) topology.

FIG. 3 shows the virtual computer system 700A having an example VLAN configuration and being connected through the physical NICs 180A and 180B to an example configuration of network entities implementing an example VLAN topology. FIG. 3 shows the virtual computer system 700A including a virtualization software 360. As described above, for this particular implementation, the virtualization software 360 comprises the kernel 600, the loadable modules and drivers 610 and the VMMs 300A, 300B, 300C and 300D, which are all shown in FIG. 2. The virtualization software 360 supports the VMs 200A, 200B, 200C and 200D, as described above. The VM-1 200A includes the virtual NIC 280A, the VM-2 200B includes the virtual NIC 280B, the VM-3 200C includes the virtual NIC 280C, and the VM-4 200D includes the virtual NICs 280D and 280E. The VLAN configuration for the virtual computer system 700A is as follows: the VM-1 200A is restricted to a first VLAN (VLAN-1) having a VLAN identifier of 1, the VM-2 200B and the VM-3 200C are both restricted to a second VLAN (VLAN-2) having a VLAN identifier of 2, and the VM-4 200D has access to both the first VLAN and the second VLAN, with access to the first VLAN being provided through the virtual NIC 280D and access to the second VLAN being provided through the virtual NIC 280E.

The physical NICs 180A and 180B are connected to a VLAN switch 22A, which is further connected to a VLAN switch 22B by a VLAN bridge 24. VLAN switches and VLAN bridges are described in the IEEE 802.1Q standard. Thus, according to the IEEE 802.1Q standard, all end stations connected to the VLAN switches 22A and 22B form a VLAN topology 40. Besides the virtual computer system 700A, other end stations that are connected to the VLAN switches 22A and 22B include a second physical computer (PC-2) 702B that includes a NIC 704B, a third physical computer (PC-3) 702C that includes a NIC 704C, a fourth physical computer (PC-4) 702D that includes a NIC 704D, and a fifth physical computer (PC-5) 702E that includes a NIC 704E.

Each of the physical computers 702B, 702C, 702D and 702E is restricted to either the VLAN-1 or the VLAN-2. The physical computers may be restricted to their respective VLANs in any of a variety of ways. For example, each of the physical computers 702B, 702C, 702D and 702E may include an OS that provides VLAN functionality, such as a recent Linux distribution that includes an 802.1Q driver. More specifically, the physical computer 702C and the physical computer 702D are placed on the first VLAN, while the physical computer 702B and the physical computer 702E are placed on the second VLAN. Thus, as illustrated in FIG. 3, the broadcast domain of the first VLAN includes the VM-1 200A, the VM-4 200D, the physical computer 702C and the physical computer 702D, while the broadcast domain of the second VLAN includes the VM-2 200B, the VM-3 200C, the VM-4 200D, the physical computer 702B and the physical computer 702E. The VLAN configuration illustrated in FIG. 3 provides improved security to the end stations on the first VLAN from the end stations on the second VLAN, and to the end stations on the second VLAN from the end stations on the first VLAN. In particular, the VLAN configuration provides improved security to the VM-1 200A from the VM-2 200B and the VM-3 200C, and to the VM-2 200B and the VM-3 200C from the VM-1 200A. FIG. 3 also shows that the VLAN switch 22B is also connected to a router 26, which is attached to one or more other network(s) 28.

Other computer systems can have a wide variety of other physical network configurations and a wide variety of VLAN configurations. For example, other embodiments can include multiple virtual computer systems, with each virtual computer system including one or more VMs. The virtualization software supporting the VMs in each of these virtual computer systems may be different from one another, or some or all of the virtual computer systems may have substantially the same virtualization software. In the case of a computer system including multiple VMs in each of multiple virtual computer systems, each of the virtual computer systems may implement its own VLAN configuration, just as the virtual computer system 700A has its own VLAN configuration. In effect, each VM in each of the virtual computer systems is an end station in the VLAN topology for the entire bridged network. A system administrator may choose which end stations are on each VLAN, regardless of whether each end station is a physical computer, a VM or some other network entity.

Figure 4:
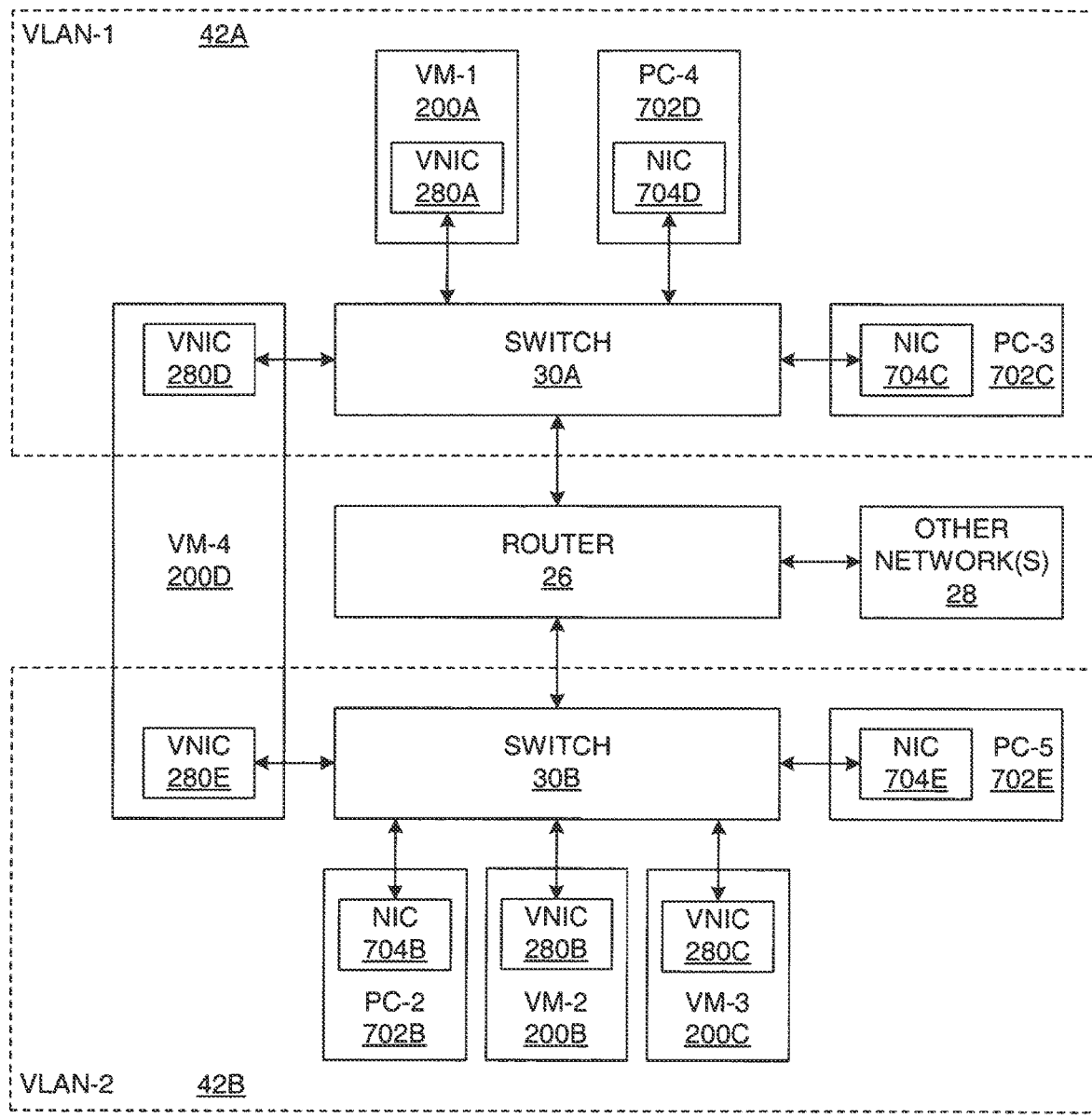
FIG. 4 illustrates the logical configuration of the VLAN topology of FIG. 3.

FIG. 4 illustrates the logical configuration of the VLAN topology 40 of FIG. 3. Thus, the VLAN topology 40 comprises a VLAN-1 42A and a VLAN-2 42B. The VLAN-1 42A includes a logical switch 30A that represents the VLAN switching implemented by the virtualization software 360 within the virtual computer system 700A, the VLAN switches 22A and 22B and the VLAN bridge 24 with respect to data frames on the VLAN-1 42A. Similarly, the VLAN-2 42B includes a logical switch 30B that represents the VLAN switching implemented by the virtualization software 360 within the virtual computer system 700A, the VLAN switches 22A and 22B and the VLAN bridge 24 with respect to data frames on the VLAN-2 42B. FIG. 4 also shows the logical switches 30A and 30B being connected to the router 26, which is connected to the other network(s) 28.

As shown in FIG. 4, the VLAN-1 42A includes the VM-1 200A, the physical computer 702D, the physical computer 702C and the VM-4 200D. The VM-1 200A is shown as being connected to the logical switch 30A through the virtual NIC 280A, the physical computer 702D is shown as being connected to the logical switch 30A through the physical NIC 704D, the physical computer 702C is shown as being connected to the logical switch 30A through the physical NIC 704C, and the VM-4 200D is shown as being connected to the logical switch 30A through the virtual NIC 280D.

Similarly, FIG. 4 also shows that the VLAN-2 42B includes the VM-2 200B, the VM-3 200C, the physical computer 702B, the physical computer 702E and the VM-4 200D. The VM-2 200B is shown as being connected to the logical switch 30B through the virtual NIC 280B, the VM-3 200C is shown as being connected to the logical switch 30B through the virtual NIC 280C, the physical computer 702B is shown as being connected to the logical switch 30B through the physical NIC 704B, the physical computer 702E is shown as being connected to the logical switch 30B through the physical NIC 704E, and the VM-4 200D is shown as being connected to the logical switch 30B through the virtual NIC 280E. Thus, again, the VM-4 200D is connected to the VLAN-1 42A through the virtual NIC 280D and to the VLAN-2 42B through the virtual NIC 280E. As another alternative, the VM-4 200D could be connected to both the VLAN-1 42A and to the VLAN-2 42B through a single virtual NIC.

FIG. 4 shows more clearly the broadcast domains of the VLAN-1 42A and the VLAN-2 42B that are implemented within the VLAN topology 40. Any data frame that is broadcast over the VLAN-1 42A is received by the VM-4 200D, the VM-1 200A, the physical computer 702D and the physical computer 702C. Any data frame that is broadcast over the VLAN-2 42B is received by the VM-4 200D, the physical computer 702B, the VM-2 200B, the VM-3 200C, and the physical computer 702E. FIG. 4 also shows more clearly which end stations are excluded from the broadcast domains of the respective VLANs 42A and 42B, which makes it more difficult for them to cause problems in those VLANs. For example, malicious software in the VM-2 200B would have a harder time breaking into the VM-1 200A because the VM-2 200B does not receive broadcast data frames related to the VM-1 200A, even though both VMs execute within the same physical computer.

Figure 5:
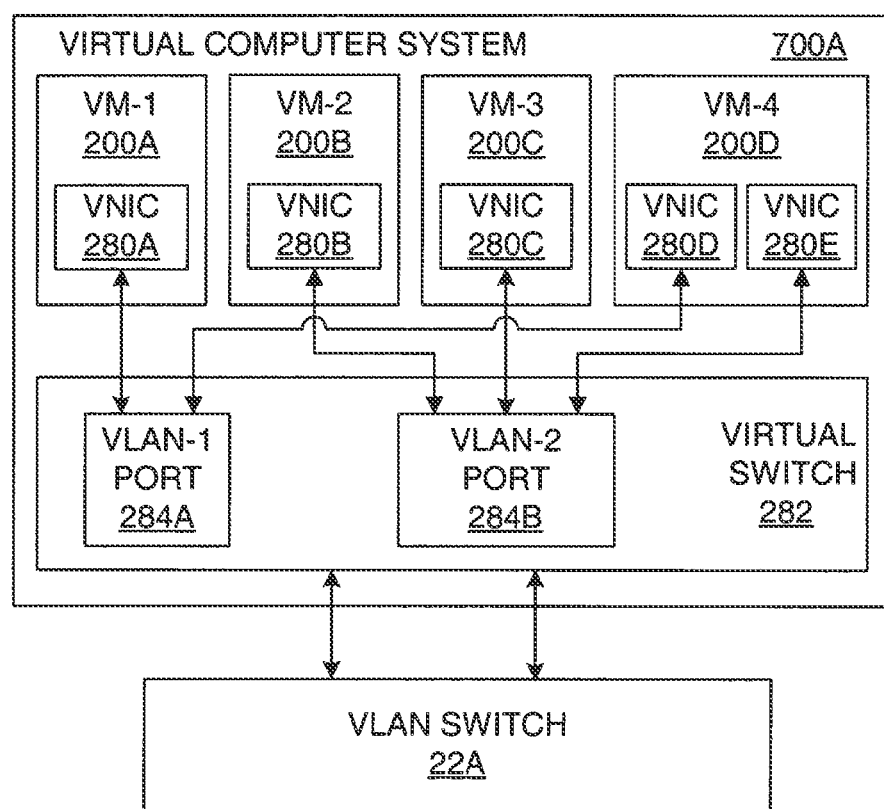
FIG. 5 illustrates one particular approach for implementing this invention in a virtual computer system.

FIG. 5 illustrates a particular method that is used in a commercial embodiment of the invention for allowing a system administrator to configure VLANs in a virtual computer system. FIG. 5 shows the virtual computer system 700A, including the VM-1 200A with the virtual NIC 280A, the VM-2 200B with the virtual NIC 280B, the VM-3 200C with the virtual NIC 280C and the VM-4 200D with the virtual NICs 280D and 280E. FIG. 5 also shows the VLAN switch 22A to which the virtual computer system 700A is connected. The virtual computer system 700A and the VLAN switch 22A may be the same as described above.

FIG. 5 also shows a virtual switch 282, which is an emulated device supported by the virtualization software 360 (see FIG. 3). The virtual switch 282 is presented to a system administrator or other user of the virtual computer system 700A through a user interface to allow the administrator to assign VMs to VLANs, as desired. The administrator may create one or more "port groups" within the virtual switch 282, where each port group corresponds to a VLAN to which VMs may be assigned. The administrator may also specify a VLAN identifier to be used for the VLAN associated with a port group. Using the same example VLAN configuration as described above, the administrator of the virtual computer system 700A may create a first VLAN port 284A that uses the VLAN identifier for the VLAN-1 42A and a second VLAN port 284B that uses the VLAN identifier for the VLAN-2 42B, as illustrated in FIG. 5. Now the system administrator may specify connections between the virtual NICs 280A, 280B, 280C, 280D and 280E and the VLAN ports 284A and 284B. As shown in FIG. 5, the virtual NIC 280A and the virtual NIC 280D are connected to the VLAN-1 port 284A, which indicates to the virtualization software 360 that outgoing data frames from these virtual NICs are to be sent out on the VLAN-1 42A and that incoming data frames will only be delivered to these virtual NICs if they were received from the VLAN-1 42A. Similarly, the virtual NIC 280B, the virtual NIC 280C and the virtual NIC 280E are connected to the VLAN-2 port 284B, which indicates to the virtualization software 360 that outgoing data frames from these virtual NICs are to be sent out on the VLAN-2 42B and that incoming data frames will only be delivered to these virtual NICs if they were received from the VLAN-2 42B. Thus, just like in FIGS. 3 and 4, the VM-1 is connected to the VLAN-1 42A through the virtual NIC 280A, the VM-2 is connected to the VLAN-2 42B through the virtual NIC 280B, the VM-3 is connected to the VLAN-2 42B through the virtual NIC 280C, the VM-4 is connected to the VLAN-1 42A through the virtual NIC 280D, and the VM-4 is connected to the VLAN-2 42B through the virtual NIC 280E.

As described above, creating multiple VLANs within a VLAN topology, with each VLAN defining a different broadcast domain that generally includes a subset of the end stations within the VLAN topology, and restricting VMs to one or more of these VLANs generally improves the security situation for a virtual computer system. Under this invention, the actions required to restrict a VM to a VLAN are performed by virtualization software within a virtual computer system, so that software entities within the VMs don't have to do anything to gain the benefits of using VLANs, and may not even be aware of the use of VLANs. Guest software can send network data frames to a virtual NIC and receive data frames from a virtual NIC, without using any VLAN identifiers. The virtualization software typically handles the VLAN functionality while data frames are being transferred between the virtual NIC and a physical NIC that is actually connected to a physical computer network.

There are other ways to configure and use VLANs in a computer system comprising one or more virtual computer systems, however, which could also provide some of these same benefits. For example, each of the VMs could be loaded with a guest OS that can provide VLAN functionality, such as a recent distribution of Linux with an 802.1Q driver. Then, the guest OS could perform the actions required to use a VLAN for network communications. For example, the guest OS 220A within the VM-1 200A could add the VLAN identifier for the VLAN-1 42A to all outgoing data frames sent to the virtual NIC 280A and only deliver incoming data frames received at the virtual NIC 280A to other software entities within the VM 200A if the data frames include the VLAN identifier for the VLAN-1 42A.

Providing the VLAN functionality within the virtualization software, however, may be more advantageous than providing the functionality from within the VMs. The VLAN coordinator 640 provides the functionality to all of the VMs 200A, 200B, 200C and 200D, so that the software within each of the VMs need not have any VLAN capabilities to realize the benefits of using VLANs. This way, even VMs running older OSs that don't support VLANs can still derive these benefits. Also, if the virtualization software 360 can take advantage of other VLAN features, such as hardware VLAN acceleration/offloading, then all of the VMs can benefit from these other features, even if the software within some of the VMs would not otherwise have the capability of using the other VLAN features.

Another advantage that is realized by implementing the VLAN functionality in the virtualization software layer, instead of within the guest OS, is that a VM can be dynamically switched from one VLAN to another without interrupting any services. If the guest OS were implementing the VLAN functionality, the network interface within the VM would need to be brought down before the switch could be made to a different VLAN, and then the network interface would need to be reconfigured. Bringing down a network interface in this manner can cause substantial adverse effects. For example, if a web server application is executing within a VM and the network interface within the VM must be brought down, any client sessions that were being hosted by the web server may be abruptly terminated, or they may be rerouted to other sockets, possibly on another VM or another physical computer. Abruptly terminating client sessions may certainly cause a variety of different adverse effects, such as interrupting a client's download of a large file, for example. Then, each of the client sessions that has been terminated must generally be restarted by the different clients. Rerouting the client sessions may also cause adverse effects, however, such as delays, inefficiencies and an increase in complexity, which increases the likelihood of a connection failure. In contrast, the virtualization software 360 can simply switch the VLAN identifier that it writes into outgoing data frames and that it looks for in incoming data frames, without stopping any services. In the web server example, ongoing client sessions may be able to continue without any noticeable interference.

Implementing the VLAN functionality in the virtualization software layer, instead of within the guest OS, may be particularly advantageous in situations where a VM may be migrated from one physical computer to another. The migration of VMs is disclosed in U.S. patent application Ser. No. 10/319,217 ("Virtual Machine Migration"), which is incorporated here by reference. A VM may be migrated to a different physical computer within the same network or even on a different network. Depending on the circumstances, it may be necessary or advantageous (a) to switch the VM to a different VLAN when it is migrated to the new physical computer, (b) to restrict the VM to a specific VLAN when it previously was not restricted to a VLAN, or (c) to remove a VLAN restriction. In any of these cases, implementing the VLAN functionality in the virtualization software layer may enable the switch in VLAN status to be completed without any interference in the operation of the VM or in the VM's network connection. In the web server example, depending on the particular implementation, a VM may be migrated to a different physical computer and the VLAN status of the VM may be changed, all without disrupting any ongoing client sessions.

Finally, implementing VLAN functionality within the virtualization software 360, instead of within the guest OSs, enables different priorities and different security policies to be implemented for different VLANs. For example, if the operation of the end stations on the VLAN-1 42A is considered a higher priority than the operation of the end stations on the VLAN-2 42B, additional security measures may be taken with respect to data frames on the VLAN-1 42A. For example, the virtualization software 360 can monitor all incoming data frames containing the VLAN identifier for the VLAN-1 42A for a Denial of Service (DoS) attack, without expending additional processor cycles monitoring incoming data frames on the VLAN-2 42B. The '779 application contains a more detailed description of DoS attacks. As described in the '779 application, performing such a DoS detection in the virtualization software 360 instead of within a VM may be advantageous, because it may prevent the VMs from being adversely affected by an attack.

As described above and in the '779 application, the NIC manager 642 preferably provides failover and failback functions, along with a load distribution function, in deciding how outgoing data frames are routed through the physical NICs 180A and 180B. To provide these functions and make these decisions, the NIC manager 642 is preferably able to determine whether each of the physical NICs 180A and 180B is functioning properly, and whether the connections from the physical NICs to the network(s) are functioning properly. This determination may be made in a conventional manner.

It would also be beneficial, however, if the NIC manager 642 could determine additional information about the network(s) to which the virtual computer system is connected, such as the operational status of one or more data links or network components within those networks. This additional information can be used by the NIC manager 642 to make better decisions regarding the routing of outgoing data frames, as described in the '779 application, and it can be used by the NIC manager 642 and other software units for other purposes. There are also known ways of obtaining some of this additional information.

In addition, however, depending on the implementation, the NIC manager 642 may be able to determine additional information about the status of network components and data links by sending data frames out onto the network using the physical NICs 180A and 180B and one or more of the VLANs that are established for use by the VMs in the virtual computer system. For example, assuming that the physical NICs 180A and 180B are connected to different switches, the NIC manager 642 can send out data frames for each of the VLAN IDs used by the VMs using the physical NIC 180A, for example, and determine which of the data frames are received at the other physical NIC 180B. Based on the physical configuration of the networks, the VLAN topology for each VLAN ID used by the VMs and the data frames received at the physical NIC 180B, a network administrator may obtain clues regarding the status of different network components and data links within the network. In particular, for example, network failures often result from mistakes made by network administrators in configuring the various components of a network, and, when VLANs are used in the network, these configuration errors often affect some, but not all, of the VLANs. In this case, testing the network operation for each of the VLANs used in the virtual computer system often provides very useful information regarding the operation of the network. Based on the test results and the network configuration, a network administrator may be able to narrow down a configuration error to one or just a few network components, for example.

As a more specific example implementation, suppose that a virtual computer system has three physical NICs, namely a first physical NIC, a second physical NIC and a third physical NIC, each connected to a different switch. Suppose further that the virtual computer system uses four different VLANs having a first VLAN ID, a second VLAN ID, a third VLAN ID and a fourth VLAN ID, respectively. In this case, in one example implementation, a NIC manager within the virtual computer system may send data frames out over each of the four VLANs for all possible pairings of the physical NICs. Specifically, for each of the four VLANs, the NIC manager may send data frames (1) out through the first physical NIC that are addressed to the second physical NIC, (2) out through the first physical NIC that are addressed to the third physical NIC, (3) out through the second physical NIC that are addressed to the first physical NIC, (4) out through the second physical NIC that are addressed to the third physical NIC, (5) out through the third physical NIC that are addressed to the first physical NIC, and (6) out through the third physical NIC that are addressed to the second physical NIC.

Based on which data frames are received at the respective destinations, the NIC manager and/or a network administrator may be able to draw various conclusions regarding failures within the computer network, and take appropriate actions in response to the detected failures. For example, suppose that data frames that are sent out through the first physical NIC using the first VLAN ID are not received at either the second physical NIC or the third physical NIC, but data frames that are sent out through the first physical NIC using the other VLANs are generally received at both the second physical NIC and the third physical NIC. These results suggest that there is some sort of problem related to the first VLAN ID, somewhere along the path from the first physical NIC. For example, a switch along that path may be configured in such a way that the switch doesn't allow data frames having the first VLAN ID to pass through. For example, if the first physical NIC and the second physical NIC were connected to the same switch and the third physical NIC were connected to a different switch, then these test results would suggest that the first VLAN ID may be disabled at the switch port to which the first physical NIC is connected. In response to such a situation, the NIC manager may ensure that any data frames from any of the VMs in the virtual computer system that are on the first VLAN are sent out through either the second physical NIC or the third physical NIC, and not the first physical NIC. An alert may also be generated to a network administrator, allowing the network administrator to track down and resolve the problem.

As another example, suppose that no data frames are received at any of the physical NICs for the first VLAN, but data frames are generally received at all three physical NICs for the other VLANs. In this case, the NIC manager may communicate this information to a VLAN coordinator within the virtual computer system, which may switch the first VLAN to use a fifth VLAN ID, instead of the first VLAN ID. A wide variety of other test results are also possible, and, depending on the results, the network configuration and the sophistication of the virtualization software, a variety of other remedial actions are also possible. Thus, the NIC manager, the VLAN coordinator and/or other software modules within the virtualization software may be configured to apply a specified policy, for example, for automatically detecting and responding to problems encountered in the network, especially for problems related to VLAN configurations. In any case, the test results may also be used to assist a network administrator in pinpointing and correcting a wide variety of network problems.

What is claimed is:

1. A method performed in a virtual computer system, the virtual computer system comprising virtualization software that supports a first virtual machine (VM), the virtualization software providing the first VM with a first virtual network interface, wherein the first VM includes a first network interface card (NIC) driver loaded into the first VM, the method comprising:
   receiving, at the a virtual local area network (VLAN) coordinator, an outgoing network data frame from the first NIC driver;
   modifying the outgoing network data frame, at the VLAN coordinator, by writing a first VLAN identifier associated with the first VM into the outgoing network data frame received from the first NIC driver, wherein the first VM is within a first VLAN, wherein the first VLAN identifier restricts transmission of the outgoing network data frame from the first NIC driver to the first VLAN associated with the first VLAN identifier, wherein the modifying occurs outside of the first VM, and wherein modifying the outgoing network data frame is transparent to the first VM;
   transmitting the modified outgoing network data frame over a physical network, the transmitting being performed by one or more physical network interfaces connected to the computer system and the physical network;
   receiving, at the VLAN coordinator, an incoming network data frame from the the physical network;
   determining the incoming network data frame includes the first VLAN identifier,
   removing, at the VLAN coordinator, the first VLAN identifier from the received incoming network data frame; and
   conveying the received incoming network data frame to the first VM through the first NIC driver.

2. The method of claim 1, further comprising:
   adding a second VLAN identifier to the received incoming network frame prior to conveying the received incoming network frame to the VM, wherein removing the first VLAN identifier and adding the second VLAN identifier is transparent to the VM.

3. The method of claim 2, wherein the physical network comprises a single physical network over which outgoing network frames are transmitted and from which incoming network frames are received.

4. The method of claim 2, wherein the second VLAN identifier is selected by the VLAN coordinator.

5. The method of claim 2, wherein the VLAN is a private VLAN, and wherein the first VLAN identifier is a public VLAN identifier and wherein the second VLAN identifier is a private VLAN identifier.

6. The method of claim 2, wherein the VLAN is a public VLAN, and wherein the first VLAN identifier is a private VLAN identifier and wherein the second VLAN identifier is a private VLAN identifier.

7. The method of claim 1, wherein the first VLAN identifier was selected by a user to restrict a transmission of the network frame sent from the VM to a particular VLAN.

8. A non-transitory computer-readable storage medium including instructions, that when executed by a processor, cause a virtual local area network (VLAN) coordinator to perform the steps of:
   receiving an outgoing network data frame from a first network interface card (NIC) driver loaded into the first VM;
   modifying the outgoing network data frame by writing a first VLAN identifier associated with the first VM into the outgoing network data frame received from the first NIC driver, wherein the first VM is within a first VLAN, wherein the first VLAN identifier restricts transmission of the outgoing network data frame from the first NIC driver to the first VLAN associated with the first VLAN identifier, wherein the modifying occurs outside of the first VM, and wherein modifying the outgoing network data frame is transparent to the first VM;
   transmitting the modified outgoing network data frame over a physical network;
   receiving an incoming network data frame from the physical network;
   determining the incoming network data frame includes the first VLAN identifier,
   removing the first VLAN identifier from the received incoming network data frame; and
   conveying the received incoming network data frame to the first VM through the first NIC driver.

9. The non-transitory computer-readable storage medium of claim 8, wherein the processor further causes the VLAN coordinator further performs the steps of:
   adding a second VLAN identifier to the received incoming network frame prior to conveying the received incoming network frame to the VM, wherein removing the first VLAN identifier and adding the second VLAN identifier is transparent to the VM.

10. The non-transitory computer-readable storage medium of claim 9, wherein the physical network comprises a single physical network over which outgoing network frames are transmitted and from which incoming network frames are received.

11. The non-transitory computer-readable storage medium of claim 9, wherein the second VLAN identifier is selected by the VLAN coordinator.

12. The non-transitory computer-readable storage medium of claim 9, wherein the VLAN is a private VLAN, and wherein the first VLAN identifier is a public VLAN identifier and wherein the second VLAN identifier is a private VLAN identifier.

13. The non-transitory computer-readable storage medium of claim 9, wherein the VLAN is a public VLAN, and wherein the first VLAN identifier is a private VLAN identifier and wherein the second VLAN identifier is a private VLAN identifier.

14. The non-transitory computer-readable storage medium of claim 8, wherein the first VLAN identifier was selected by a user to restrict a transmission of the network frame sent from the VM to a particular VLAN.

15. A system comprising:
a virtual local area network (VLAN); and
a host comprising:
a processor;
a virtual machine (VM); and
a VLAN coordinator communicatively coupled to the VM, wherein the VLAN coordinator is a component of virtualization software running outside the VM and supporting operation of the VM on a host system, the VLAN coordinator configured to cause the processor to:
receive an outgoing network data frame from a network interface card (NIC) driver loaded into the VM;
modify the outgoing network data frame by writing a VLAN identifier associated with the VM into the outgoing network data frame received from the NIC driver, wherein the VLAN identifier restricts transmission of the outgoing network data frame from the NIC driver to the VLAN associated with the VLAN identifier, wherein the modifying occurs outside of the VM, and wherein modifying the outgoing network data frame is transparent to the first VM;
transmit the modified outgoing network data frame over a physical network;
receive an incoming network data frame from the physical network;
determine the incoming network data frame includes the first VLAN identifier,
remove the VLAN identifier from the received incoming network data frame; and
convey the received incoming network data frame to the VM through the NIC driver.

16. The system of claim 15, wherein the VLAN coordinator is further configured to:
add a second VLAN identifier to the received incoming network frame prior to conveying the received incoming network frame to the VM, wherein removing the VLAN identifier and adding the second VLAN identifier is transparent to the VM.

17. The system of claim 16, wherein the second VLAN identifier is selected by the VLAN coordinator.

18. The system of claim 16, wherein the VLAN is a private VLAN, and wherein the first VLAN identifier is a public VLAN identifier and wherein the second VLAN identifier is a private VLAN identifier.

19. The system of claim 16, wherein the VLAN is a public VLAN, and wherein the first VLAN identifier is a private VLAN identifier and wherein the second VLAN identifier is a private VLAN identifier.

20. The system of claim 15, wherein the first VLAN identifier was selected by a user to restrict a transmission of the network frame sent from the VM to a particular VLAN.

* * * * *